United States Patent [19]

Wolvek

[11] 3,879,516
[45] Apr. 22, 1975

[54] METHOD OF CONSTRUCTING A CATHETER
[75] Inventor: Sidney Wolvek, Brooklyn, N.Y.
[73] Assignee: Technibiotics, Inc., Brooklyn, N.Y.
[22] Filed: Dec. 7, 1972
[21] Appl. No.: 313,124

[52] U.S. Cl. ............... 264/135; 264/255; 264/264; 264/305
[51] Int. Cl. ..................... B29c 13/04; B29d 3/02
[58] Field of Search ............ 264/255, 264, 135, 88, 264/305

[56] References Cited
UNITED STATES PATENTS

| 2,330,400 | 9/1943 | Winder | 264/88 X |
| 3,052,927 | 9/1962 | Hoppe | 264/255 X |
| 3,071,817 | 1/1963 | Laporte | 264/308 X |
| 3,308,522 | 3/1967 | Ivester | 264/294 X |
| 3,379,591 | 4/1968 | Bradley | 264/308 X |
| 3,492,393 | 1/1970 | Nourot | 264/255 X |
| 3,691,269 | 9/1972 | Robinson | 264/255 |

Primary Examiner—Richard R. Kucia
Attorney, Agent, or Firm—Darby & Darby

[57] ABSTRACT

A catheter which is relatively rigid in compression and torsion while flexible in bending includes a unitary tubular member including inner and outer layers of a soluble polymer composition, such as polyurethane, whose adjoining surfaces are chemically bonded during manufacture. A filament core, preferably in the form of a coil of the same polymer is embedded within and chemically bonded to the tubular member to form a catheter whose molecules are aligned both longitudinally and along the direction of the coil. Methods of manufacture of the catheter include forming the polymer composition layers within a rigid tube and, alternatively, forming the layers over a rigid supporting rod.

5 Claims, 8 Drawing Figures

METHOD OF CONSTRUCTING A CATHETER

BACKGROUND OF THE INVENTION

This invention relates, in general, to surgical instruments and more particularly to catheters and methods of manufacture of catheters.

In referring to catheters in the instant disclosure and appended claims, it is understood that the invention is equally applicable to those devices which, in general, are inserted into cavities or blood vessels in the body for any one of a number of purposes such as removal or introduction of fluids or gasses or therapy through visualization with the use of a fluoroscope. Such catheters include instruments such as ureteral, urethral and cannulae catheters, bougies, endotrachial tubes, filiforms and the like.

In the insertion of a catheter into its receiving passage, the physician must typically exert a force on its proximal end along the longitudinal axis of the instrument to advance its distal end within the body. He must also be able to direct the catheter around a curved path in a particular direction, for example, when the catheter must turn into one of a number of blood vessels which branches into a main vessel.

In the past, in order to achieve sufficient longitudinal rigidity or "stiffness" for forward advancement, catheters have been formed with thick walls. Of course, as the walls were thickened, the catheters were rendered less flexible or maneuverable along curved passages in the body. A further problem arises as the catheter is advanced around these curved paths, namely "kinking" of the tubes which results in an obstruction to the flow of fluids therethrough. Prior catheters have been provided with wire or textile fiber reinforcing matrices in order to prevent such kinking and collapsing. However, the additional structure has necessitated thickening the catheter walls thereby resulting in loss of flexibility. The thickened catheter walls reduce the inside diameter and therefore reduce the fluid or blood carrying capacity of the catheter since the outside diameter must be fixed in relation to the diameter of the blood vessel. Additionally, since the reinforcing matrices are only mechanically bonded to the catheter walls, they have occasionally become stripped from the catheter walls, rendering them useless. In summary, in the past, the qualities of flexibility in bending and compressive rigidity have been mutually contradictory, i.e. one has not been satisfactorily provided without decreasing the effectiveness of the catheter in the other.

A third desirable characteristic of catheters is rigidity in torsion. It is desired that the rotation of the proximal end of the catheter by the physician result in an analogous rotation of the distal end within the body passage in order to facilitate directing the instrument through the desired vessels, etc. However, an improvement of torsional rigidity has usually resulted in thickening the catheter walls which is disadvantageous as discussed above.

SUMMARY OF THE INVENTION

Accordingly, one object of this invention is to provide a new and improved catheter which is both non-collapsing during advancement in the longitudinal direction and "non-kinking" when directed along curved paths.

Another object of the present invention is to provide a new and improved non-collapsing and non-kinking catheter having relatively thin walls.

Still another object of this invention is to provide a catheter having improved means of reinforcement for preventing kinking, which reinforcing means are chemically bonded into the catheter wall to prevent it from being stripped therefrom.

A further object is to provide a non-kinking, non-collapsing catheter which has relatively great torsional rigidity.

A still further object of the present invention is to provide new and improved methods of manufacturing catheters for obtaining instruments which are both flexible in bending and rigid in compression and torsion.

Yet another object is to provide a catheter formed of material amenable to chemical bonding with tips and/or inflatable members.

In accordance with the preferred embodiments of this invention, these and other objects are obtained by a catheter including an elongate unitary flexible tubular member comprising inner and outer layers of the same or compatible soluble polymer compositions and a reinforcing core embedded within the tubular member formed of the same polymer composition. The surfaces of the reinforced core and inner and outer layers will flow together during manufacture under predetermined conditions and will bond together by means of controlled solvent evaporation to form an integral unit. The molecular flow of the resulting catheter is in two directions, i.e. along the longitudinal axis of the tubular member and in the direction of the reinforcing core. Such bidirectionality makes for a non-collapsing, non-kinking catheter having good torsional rigidity and whose walls are relatively thin. Polyurethane has proven to be one desirable polymer composition since the polyurethane molecules are relatively easily broken by certain organic solvents, thereby making it easy to chemically bond various catheter tips or expandable devices to the catheter's distal end which is inserted into the body passage in addition to being amenable to forming an integral unit, i.e. amenable to chemically bonding to subsequently deposited polyurethane material.

Two methods of manufacturing catheters according to the present invention are disclosed. One method includes depositing the polymer layers with the filament core on the inner surface of a rigid supporting tube. Another method includes depositing the polymer layers with the filament core on the outer surface of a supporting rod. The sequence of forming each layer and inserting the core determines the particular layer in which the core will be embedded. In both methods, the subsequently deposited polymer layer causes the surfaces of the first layer and filament core to melt promoting cross-linking of the molecules. The catheter resulting from either of these methods has both excellent bending flexibility and compressive and torsional rigidity characteristics.

DESCRIPTION OF THE DRAWINGS

A more complete appreciation of the invention and many of the attendant advantages thereof will be readily appreciated as the same becomes better understood by reference to the following description when considered in connection with the accompanying drawings, in which.

DESCRIPTION OF THE PREFERRED EMBODIMENTS

Figure 1:
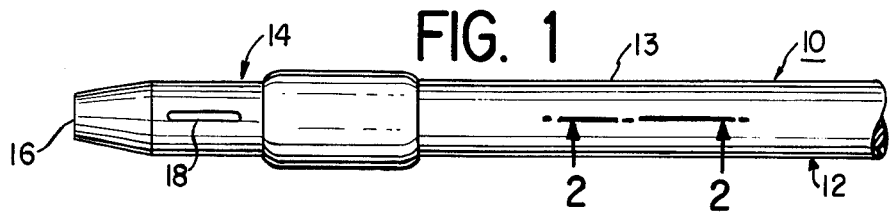
FIG. 1 is a longitudinal partial view of a catheter constructed according to the present invention.

Referring now to the drawings wherein like reference numerals designate identical elements throughout the several views, FIG. 1 illustrates a catheter 10 which includes a flexible body portion 12 comprising a tubular member 13 and a tip portion 14 connected to the distal end of the body portion. Tip portion 14 may include any of a number of conventional catheter tips determined by the intended use of the instrument. For example, it may include a tapered closure end 16 having radial ports 18 which communicate with the axial passage 20 (FIG. 2) of the tubular member 13. An inflatable member 22, as is often used, may also be provided. If such inflatable member is used, an air tube similar to that shown in U.S. Pat. No. 3,566,874, issued on Mar. 2, 1971 to Thomas H. Shepherd et al., would be provided to extend longitudinally within the catheter body portion 12. Such air tube has not been shown for the sake of clarity, but may be provided in a catheter constructed according to the present invention as will be readily understood by those skilled in the art.

Figure 2:
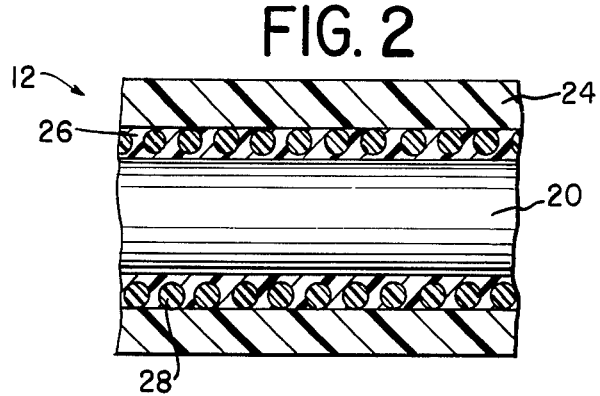
FIG. 2 is an enlarged sectional view taken along line 2—2 of FIG. 1.

Referring to FIG. 2, the tubular member 13 of FIG. 1 is shown in section as including an outer layer 24 of a flexible plastic material, such as a polymer, and a layer 26 also of a polymer material concentrically disposed within the outer layer 24. The structure of the body portion 12 is completed with a filament core preferably comprising a helically wound filament coil 28 within a portion of tubular member 13. In the embodiment shown in FIG. 2, the coil 28 is embedded within the inner polymer layer 26. However, the coil might just as well be embedded within outer layer 24 according to the invention, depending on the particular sequence of steps used during the manufacture of the catheter.

The inner and outer polymer layers 24, 26 and the filament coil 28 are preferably constructed of the same material for reasons discussed below, although compatible polymer compositions might be used just as well. It has been found that polyurethane serves especially well, and the following description will refer to the use of polyurethane. However, it will be understood that material other than polyurethane may be used to good advantage within the scope of the invention, the main criteria being the solubility of the material in a particular organic solvent or the bonding capacities between the polymers.

Referring to FIG. 3, a first preferred method of manufacturing a catheter according to the present invention is illustrated. An elongate, rigid tube 30 is employed on whose inner surface the catheter will be constructed. The tube 30 must be of a material which will not react chemically with polyurethane, and glass has been found to work fairly well. The inner diameter of the glass tube 30 determines the outer diameter of the catheter. One end (not shown) of the glass tube is connected to a vacuum pump while the other end (not shown) is positioned within a reservoir of polyurethane dissolved in an organic solvent such as tetrahydrofuran. In one typical construction, polyurethane having a viscosity of 0.18 minutes measured on Zahn 4, was employed. The vacuum pump draws the polyurethane into the tube coating the inner surface thereof. The film of polyurethane gels or sets on exposure to filtered air which is directed through the glass tube subsequent to the deposition of polyurethane therein. As an example, gelling air at room temperature has been directed into the glass tube at a flow rate of 0.5 liters per minute to achieve gelling.

Figure 3A:
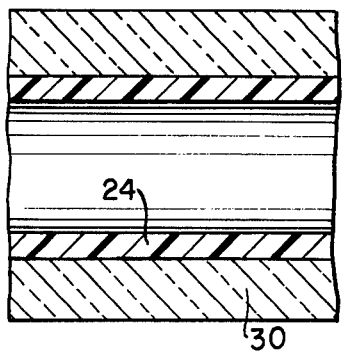
FIGS. 3A–3C are side views in section illustrating in a progressive manner the construction of the catheter according to one preferred method of manufacture.

Between coatings the glass tubes containing the gelled films of polyurethane are then placed into forced air ovens to bake out any traces of residual solvent in the polyurethane. It has been found that a bake which lasts for about three hours and which is conducted at about 55°C, is sufficient. Of course, other times and temperatures may be found satisfactory depending on the degree to which the residual solvent is undesirable. For example, times on the order of one-half hour at 55°C have been used. Referring to FIG. 3A, the several films of polyurethane are seen to form the outer polyurethane layer 24 of the tubular member on the inner surface of glass tube 30.

The above precedure of forming a film of polyurethane within the glass tube and causing the film to gel and baking-out, is successively repeated until the thickness of the coating within the glass tube is satisfactory depending on the intended use of the instrument, e.g. 0.010 inches. It has been found to be advantageous to reverse the glass tube end-for-end as each film of polyurethane is drawn in order to achieve an even thickness of the built-up layer of polyurethane on successive coatings.

Figure 3B:
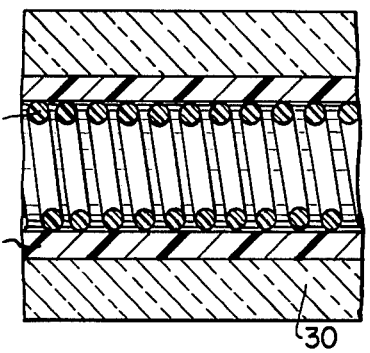
Figure 3C:
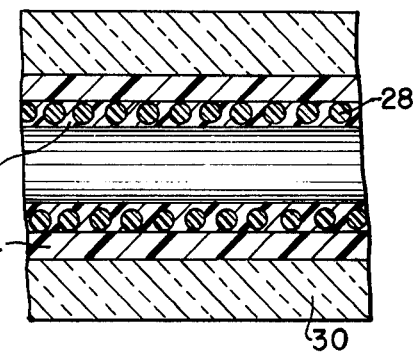

A filament of polyurethane is extruded and coiled around a mandrel (not shown) which has a diameter slightly less than the inner diameter of the glass tube and which is formed of a material which will not react with the polyurethane such as Teflon or glass. The filament, whose dimensions are determined by intended use with a typical diameter being about 0.015 inches, is wound around the mandrel forming a coil having an axial length approximately equal to the coated length of the glass tube 30. At this time, the polyurethane coil is heat-set about the mandrel for about 30 minutes at about 90°C, removed therefrom, and inserted into the polyurethane lined glass tube 30. As shown in FIG. 3B, the outer diameter of the coil 28 is adapted to be about equal to the inner diameter of the outer polyurethane layer 24.

After insertion of coil 28, the inner polyurethane layer 26 (FIG. 3C) is built up on the inner surface of outer layer 24 embedding the coil 28 which forms a core or matrix therewithin. The inner layer 26 is formed in a manner similar to that used to form the outer layer 24, i.e. by vacuum deposition of about four or five films depending on the thickness desired. Again, residual solvents are baked out after each coating. As will be readily understood, the liquid polyurethane of each film forming inner tube 26 will liquify the adjacent surfaces of outer tube 24 and helical core 28, thereby causing a cross-linking of the molecules and providing a bidirectionality of flow of these molecules (longitudinally and helically) which results in good rigidity and bending characteristics as described above. A final bakeout for about 8 hours at about 55°C is then applied.

The resulting integral catheter unit is then removed from the glass tube 30 by collapsing the instrument by a vacuum and withdrawing it using a conventional lubricant. An appropriate catheter tip and/or inflatable member may then be bonded to the distal end of the catheter.

It is understood that alternatively the coil may be inserted into the tube 30 prior to forming the outer layer 24. In this case, the coil will be embedded within the outer layer rather than in the inner layer, as previously described. This alternative structure exhibits essentially the same characteristics as the former one.

Figure 4A:
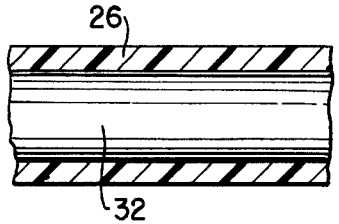
FIGS. 4A–4C are side views in section illustrating a second preferred method of manufacture of the catheter of the present invention.
Figure 4B:
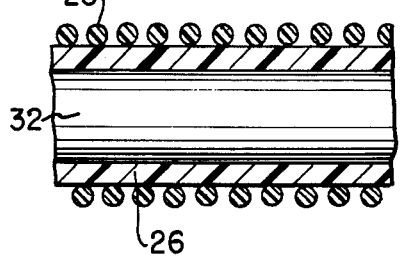
Figure 4C:
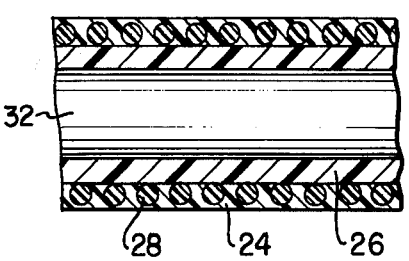

A second method of manufacture is diagrammatically illustrated in FIG. 4. A mandrel 32 formed of a low temperature melt thermoplastic material such as Rigidax, manufactured by M. Argueso and Co., Inc. of Mamaroneck, New York, having a diameter equal to the desired inside diameter of the catheter, if first immersed into a polyvinyl alcohol solution and allowed to dry. Upon drying, a thin, water soluble film is formed on the surface of the mandrel which insures that there will be no chemical interaction between the mandrel material and the polyurethane which is subsequently deposited on its surface as described below. Further, the polyvinyl alcohol film insures that a complete separation of the mandrel material from the polyurethane will be achieved when the mandrel is melted out, as will also be described below. After the polyvinyl alcohol treatment, the mandrel is immersed into a reservoir of polyurethane dissolved in an organic solvent such as tetrahydrofuran, the adhering polymer film allowed to gel in a clean room atmosphere and baked out at about 55°C for about 2 hours as in the previously described method. This procedure is successively repeated, the rod being turned end-for-end, until a sufficient thickness of the polyurethane layer is obtained, which constitutes inner layer 26 of the catheter.

A filament of polyurethane is then coiled around the urethane coated rod. In this case, the inner diameter of the coil 28 formed around inner layer 26 is precisely equal to the outer diameter of inner layer 26. After the winding, the mandrel and associated polyurethane are placed into an oven for about 30 minutes at about 90°C to set the filament into a helix.

After cooling, the mandrel is again successively immersed into liquid polyurethane a suitable number of times with end-for-end rotation between coats and subsequent baking of each film to build up the outer layer 24 which embeds the coil 28 therein. This last series of immersions causes the surfaces of the coil 28 and inner layer 26 adjacent to the polyurethane comprising the outer layer 24 to break down, thereby allowing the molecules to cross-link with each other forming the bi-directional molecular structure discussed above.

After a sufficient thickness has been obtained for outer layer 24, the unit is placed in a hot water bath and the Rigidax comprising the mandrel 32 is allowed to soften. The mandrel is removed and the urethane catheter is soaked in a room temperature water bath thereby dissolving the polyvinyl alcohol film which is then flushed away. As in the first method described above, the catheters are then dried by a final bakeout, inspected and appropriate ends attached.

Again, it is understood that alternatively the coil may be formed around the mandrel 32 prior to forming the inner layer 26. In this case, the coil will be embedded within the inner layer rather than the outer layer as described immediately above. The alternative structure exhibits essentially the same characteristics as the former one.

Of course, numerous modifications and other variations of the present invention are possible within the scope of the appended claims. For example, in the second method of manufacture described, rather than an immersion of the mandrel 32 to form films of polyurethane, a spraying technique might be utilized. A spraying technique is advantageous in that it is faster than immersion. However, although a spraying technique might be desirable to form the inner layer 26, it is desirable to form the outer layer 24 according to the immersion technique since the latter produces a denser tube which is advantageous since a denser medium is necessary when the catheter interacts with the plaque commonly found lining the arteries. Further, other configurations of the filament core are possible, such as for example as a braided structure.

The use of the same polymeric material, such for example as polyurethane, for the tubular layers 24, 26 and coil 28 of the catheter shown in FIG. 2 results in a device which has both high compressive and torsional rigidity and, at the same time, great flexibility in bending. Generally, the achievement of these desirable characteristics is the result of the chemical bonding which occurs between the inner and outer tube layers and filament core during manufacture. In particular, during construction, the reinforcing coil is mounted adjacent to a first layer of polyurethane which has already gelled. Subsequently, the second layer of polyurethane is deposited in a concentric manner relative to the first so as to embed the coil therein. The deposition of the second layer causes the polyurethane of the coil and first layer with which it contacts to melt allowing the components to flow together. Upon a controlled evaporation of solvent, the catheter components will chemically bond to form one integral unit.

The molecular flow of this unitary catheter is bidirectional. More specifically, the molecules of and adjacent to the first polyurethane layer of the tubular member run parallel to the longitudinal axis of the tubular member. Such molecular configuration results in good longitudinal "stiffness" which prevents collapsing of the device during forward advancement in a straight body passage. The molecules in the immediate vicinity of what formerly comprised the distinct helical reinforcing coil (which has become an integral part of the unitary catheter) extend in a helical direction. Such molecular configuration results in a flexible catheter which will not kink even when advanced around a right angle path in branching blood vessels or similar curved body passages. The reinforcing coil cannot become separated from the catheter wall as sometimes happened in cases where the coil was mechanically bonded to the wall. Further, the molecular configuration provides good torsional rigidity due to the helical molecular chain.

Since the polyurethane forming the inner and outer tubes and reinforcing coil is soluble in one of several organic solvents, such as tetrahydrofuran, and since catheter tips and/or inflatable members may be molded, extruded or cast from polyurethane, such tips and/or inflatable members may be chemically bonded to the distal end of the catheter body portion 12. Such chemical bonding is of much greater reliability than the mechanical connections which are currently in use.

It should also be noted that although the Figures are drawn for the sake of clarity with distinct boundary lines separating the polyurethane layers and the coil, in fact there are no distinct boundaries after completion of the construction since the adjacent portion of the components have flowed together.

What is claimed is:

1. A method of constructing a catheter comprising the steps of forming an outer catheter layer by dissolving a flexible plastic material in a solvent;

drawing a film of said dissolved flexible plastic material onto the interior surface of an elongate rigid tube, said rigid tube being formed of a material which does not react chemically with said flexible plastic material and said solvent, causing the dissolved plastic material to gel by exposing it to the ambient atmosphere for a predetermined amount of time;

baking said material for a specified time at a specified elevated temperature to expel residual solvent contained therein;

repeating the drawing, gelling and baking steps, each succeeding film liquifying and bonding to the surfaces of the previously drawn film with which it contacts, until a layer of material having a predetermined thickness is built up on the interior of the rigid tube;

extruding a thin filament of said flexible plastic material;

forming said filament into a helical coil and heat setting said coil;

inserting said coil within the built up outer layer;

forming an inner catheter layer by drawing a film of said dissolved flexible plastic material onto the interior surface of said built up outer catheter layer and around said coil, said film causing the surfaces of the previously drawn films and helical coil with which it contacts to liquify so that the film bonds to said previously drawn films and coil, causing the dissolved material to gel by exposing it to the ambient atmosphere for a predetermined amount of time;

baking said material for a specified time at a specified elevated temperature to expel residual solvents;

repeating the drawing, gelling and baking steps each succeeding film liquifying and bonding to the surfaces of the previously drawn film and helical coil with which it contacts until a layer of material having a predetermined thickness is built up on the interior of the outer layer embedding said coil;

subjecting said outer layer, inner layer and embedded coil to a final bakeout at an elevated temperature for a specified time; and removing the assembly of said outer layer, inner layer and embedded coil from the interior of said elongate rigid tube.

2. The method as recited in claim 1 wherein the gelling is accomplished by exposing the material to air flowing adjacent thereto at a rate of about 0.5 liters per minute.

3. The method as recited in claim 1 wherein the baking of each film takes place at a temperature of between 40°C and 70°C for a time of between one-half and 3 hours.

4. The method as recited in claim 1 when the final bakeout takes place at a temperature between 40°C and 70°C for about 8 hours.

5. A method of constructing a catheter comprising the steps of forming an inner catheter layer by dissolving a flexible plastic material in a solvent;

immersing a mandrel formed of a material which does not react chemically with said flexible plastic material and said solvent into a reservoir of said dissolved flexible plastic material to form a film over the surface thereof;

causing the film to gel by exposing it to the ambient atmosphere for a predetermined amount of time;

baking said film for a specified time at a specified elevated temperature to expel residual solvent;

repeating the immersing, gelling and baking steps, each succeeding film liquifying and bonding to the surfaces of the previously formed film with which it contacts until an inner layer of material formed of successive films having a predetermined thickness is built up on the mandrel;

extruding a filament of said flexible plastic material and forming it into a helical coil around said inner layer;

forming an outer catheter layer by immersing said mandrel into said dissolved flexible plastic material to form a film over the outer surface of said inner layer, said film causing the surfaces of the previously formed films and helical coil with which it contacts to liquify so that the film bonds to said previously drawn films and coil;

causing said film to gel by exposing it to the ambient atmosphere for a predetermined amount of time;

baking said film for a specified time at a specified elevated temperature to expel residual solvent;

repeating the immersing, gelling, and baking steps each succeeding film liquifying and bonding to the surfaces of the previously formed film and helical coil with which it contacts, until an outer layer of material formed of successive films is built up over the outer surface of the inner layer embedding said coil;

subjecting said outer layer, inner layer and embedded coil to a final bakeout at an elevated temperature for a specified time; and removing the assembly of said outer layer, inner layer and embedded coil from the mandrel.

* * * * *